A. HAMMER
Brewing.
No. 21,195.
Patented Aug. 17, 1858.
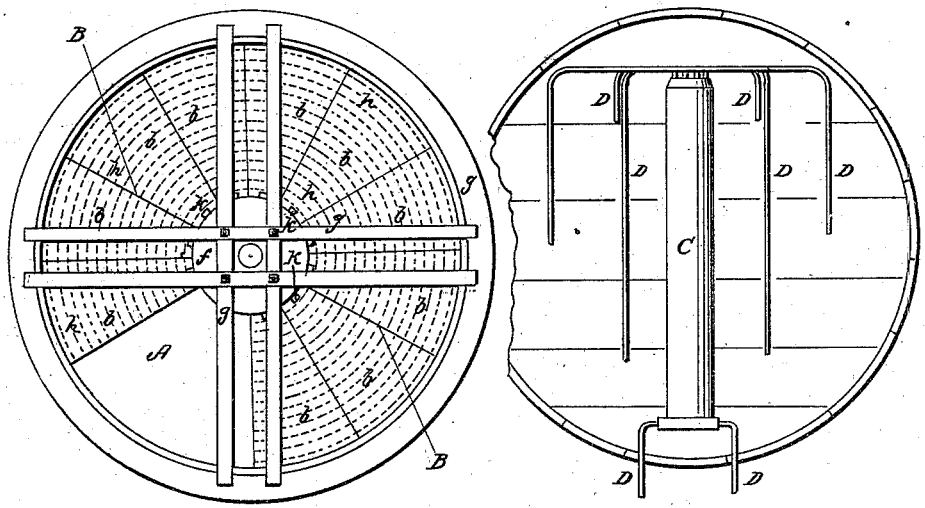
Witnesses:
Ben Morison
Wm H. Morison
Inventor:
A. Hammer

UNITED STATES PATENT OFFICE.

ADOLPH HAMMER, OF READING, PENNSYLVANIA.

APPARATUS FOR HEATING MASH-TUBS.

Specification forming part of Letters Patent No. 21,195, dated August 17, 1858; Reissued March 21, 1866, No. 1,905.

*To all whom it may concern:*

Be it known that I, ADOLPH HAMMER, of the city of New York, in the State of New York, have invented a new and useful Improvement in the Brewer's Mash Apparatus; and I do hereby declare that the following is a full, clear, and exact description of the construction and operation of the same, reference being had to the accompanying drawings, making a part of this specification, in which—

Figure 1, is a vertical section through the center of the improved apparatus; Fig. 2, a plan view of the perforated partition which is removably fixed across in the upper part of the tun; and Fig. 3, a like view of the arrangement and general construction of the steam heating vessel, with its conduit pipes passing through and connecting it with the interior of said tun.

Like letters in the different figures indicate the same parts.

In the brewer's mash apparatus, as heretofore constructed, there is no sufficient provision made for bringing the temperature of the mash to the degree proper for producing the chemical action required, without a liability of subjecting much of the mash to such an excessive heat as to prevent the subsequent production of the whole amount of saccharo-mucilaginous matter which the malt is capable of yielding.

To remedy this defect is the object of my invention.

It consists in the arrangement on the outside of the mash tun herein described and in combination therewith, of a steam heating vessel, so that after the first part of the mashing operation, (consisting in the mechanical mixing of the ground malt and hot water together in the tun), has been completed, the temperature of the mash may, without any liability to injuring the same by overheating, be raised by the operator to the degree required, by drawing therefrom through the said heater, any suitable quantity of the thin fluid extract of the malt which may have passed through the usual false bottom, and then returning it into the tun.

Referring to the drawings, A, is the mash tun; B, the removable perforated partition; C, the steam heating vessel; and D—D— the conduit pipes leading through the same from the bottom of the interior of the tun— the usual "rakes," and "false bottom" of the tun, not having any necessary connection in illustrating the present invention, are not shown in the drawings.

The partition (B) is fixed horizontally across within the tun, at about one fourth of the whole inner height of the same, below its upper end. It is constructed and fixed so as to be readily removed therefrom for cleansing the tun, by being divided radially into a number of equal parts, b—b, each part resting securely, against displacement by the pressure of the contents of the tun, with its broader end between two flanges or projections, e—e', which are fixed on the inner side of the tun, and with its narrower end in a double flanged holder, f, which is made of metal and suspended, by bolts, from the frame, g, so that the usual rake shaft may pass through its center. Each of these separate parts of the partition (B) is perforated with numerous small holes, h—h, which are enlarged at the under side of the partition, in a well known manner, to prevent choking. The recess between the two flanges of the holder (f) is deeper than the length of the pieces (b) required for their support therein, so as to allow of their narrower ends being passed sufficiently far into the said recess of the holder (f) to allow of their broader ends being passed freely over the edge of the fixed upper projection (e) preparatory to inserting the said broader ends between the said two projections (e, and e'); and when so inserted they are prevented from slipping out therefrom, by the insertion of a pin, k, down through the smaller end of each, so that it shall bear against the outer edges of the flanges of the said holder.

The steam heating vessel (C) is a long cylindrical, metallic vessel (say from 6 to 15 feet long, and one foot in diameter, dependent upon the size of the tun) which is supported in nearly a horizontal position directly beneath the mash tun. It has a series of conduit pipes, D—D, each passing separately and longitudinally through it, and all extending therefrom so that their upper ends shall pass up through a different part of the bottom of the tun and open into the space which is below the usual false bottom; while their other ends extend outwardly from the heater so as to reach an open receiver of any suitable kind, to be provided for the purpose, from which the extract (to be run from the tun through the said heater for the purpose of being warmed as will hereinafter be described) may afterward, by pumping or otherwise, be returned into the upper part of the tun as occasion may require. The said pipes, D—D, are fixed "steam-tight" through the ends of the heating cylinder (C), and the latter also provided with supply and outlet pipes connected with a steam generator, of any suitable kind, so that steam can be maintained therein when required for the purpose of heating the conduit pipes and their contents. Each of the conduit pipes is also fitted with a stop cock between the heater and the bottom of the tun, and so arranged as to enable the operator conveniently to close or open the same as occasion may require.

The capacity of the space between the partition (B) and the false bottom of the tun, should be adapted to the quantity of the mash to be made at one operation, or vice versa, the mash to the space.

Operation: As the mixture called the mash is being produced in the tun, its temperature becomes too low to excite the subsequent chemical action necessary for producing the required amount of saccharo-mucilaginous extract from the malt, and must be provided for in such a manner as not to overheat any portion of the mash, if the best and most economical results are to be obtained. This is effected by means of the steam heating vessel (C) and the conduit pipes (D—D), in the following manner. Steam being supplied continually to the interior of the vessel (C) from any appropriate source during the warming process, the operator, as occasion may require, opens all the stop cocks in the conduit pipes (D—D) and thus permits the thin fluid extract, which may have passed through the false bottom of the tun, to flow through the heating vessel (C) to the receiver before mentioned. From this vessel he then immediately returns it into the upper part of the tun, from whence, passing freely through the perforated partition (B) it gradually sinks through the mash, and thus necessarily diffusing the increased temperature which it has acquired in its passage through the heater (C) it enables the operator gradually to raise the temperature of the whole mash to the degree proper for exciting the chemical action required. After the temperature of the mash has thus been brought to the degree which is known to be most proper for the purpose, the stop-cocks in the conduit pipes (D—D) are all closed by the operator, and warm water then run into the tun from above; which water, through the instrumentality of the perforated partition (B), now in contact (nearly) with the mash below, is prevented from either perforating, breaking up, or causing the mash to float thereon, as heretofore; and it being thus kept from penetrating the mash so confined closely between the fixed partition (B) and the false bottom, it necessarily forms a stratum over the same which not only aids in preserving the warmth of the mash, but prefectly protects it also from any contact with the atmosphere during the time required for the water so to remain; and afterward, when the usual outlet valve of the tun is opened, the said partition also aids in retarding and distributing the said stratum of warm water, so that it is caused to sink intimately and gradually down between all the insoluble remnants of the malt, and thus to wash out and carry with it in solution the whole of the saccharo-mucilaginous matter which may have been produced therefrom.

It will be perceived that by means of a steam heating vessel arranged in the outside of a mash tun, and connected with its interior, substantially in the manner described, the temperature of the contained mash can be easily and gradually raised by the operator to the moderate degree required to produce the necessary chemical action therein, without any liability of his injuring it by an excessive heat, because neither the malt itself, nor any of the thick mash, can come into direct contact with the heater—which latter is the case where a coil of pipe, or other steam heater is placed within the tun, and so, necessarily in such direct contact with the thick semifluid mash as to overheat those portions of it which are in such contact, before a sufficient diffusion of the heat can take place therefrom to warm the whole mass up to the degree proper for the purpose; nor can the thin saccharo-mucilaginous extract which is being drawn off through the heater (C), as described, become injuriously heated thereby, because, being in rapid motion at the time, none of its particles can remain in direct contact with the heated pipes (D—D) a sufficient length of time to produce such an effect; while the increase of temperature which the fluid receives from the heater is amply sufficient for the purpose of warming the whole mash as required, when it is returned to the same in the tun as described; and consequently, also without the liability of overheating any of the mash thereby—as is the case where successive portions of hot water are forced upwardly into the tun from below the false bottom for the purpose of washing out the extractive matter.

Two other important advantages, though incident to this part of my invention, arise from the fact that the heater, being entirely on the outside of the tun, affords more convenient access for repairing it; and also does not hinder the workman in the necessary operation of so cleansing the tun as to keep it perfectly sweet and clean.

I am aware that Bessemer's apparatus for warming saccharine liquids, both warms the contained liquid and washes the molasses from the crystalline sugar; but this apparatus is in no way adapted for producing and extracting from malt the required saccharo-mucilaginous matter which, with water, constitutes wurt; I therefore do not claim anything appertaining to said apparatus, but

What I claim as my invention and desire to secure by Letters Patent, is—

The arrangement on the outside of the mash tun herein described and in combination therewith of a steam heater in such a manner that any suitable quantities of the fluid extract of the malt may, at the discretion of the operator, be withdrawn from the tun through the said heater so as to be warmed by the latter as it passes through the same to any suitable receiver provided for the purpose, that it may immediately afterward be returned into the tun for the purpose of raising the temperature of the mash therein to the degree required, as described; the said heater being connected with the interior of the tun, and the said pipes being provided with cocks substantially in the manner set forth and described.

A. HAMMER.

Witnesses:
   BEN. MORISON,
   WILLIAMS OGLE.

[FIRST PRINTED 1911.]